United States Patent [19]

Miletich

[11] Patent Number: 5,010,652
[45] Date of Patent: Apr. 30, 1991

[54] OPTICALLY GUIDED POWER SABRE SAW

[76] Inventor: David J. Miletich, 8206 Mason Hill Rd., Woodstock, Ill. 60098

[21] Appl. No.: 495,105

[22] Filed: Mar. 19, 1990

[51] Int. Cl.$^5$ .............................................. B27B 19/09
[52] U.S. Cl. ...................................................... 30/393
[58] Field of Search ........................... 30/392, 393, 394

[56] References Cited

U.S. PATENT DOCUMENTS

| 3,456,698 | 7/1969 | Csaki | 30/392 X |
| 3,494,391 | 2/1970 | Mango | 30/394 |
| 3,504,716 | 4/1970 | Bush et al. | 30/392 X |
| 4,628,459 | 12/1986 | Shinohara et al. | 30/393 X |
| 4,833,782 | 5/1989 | Smith | 30/392 |

Primary Examiner—Z. R. Bilinsky
Attorney, Agent, or Firm—Michael I. Kroll

[57] ABSTRACT

An optically guided power sabre saw is disclosed. The optically guided power sabre saw includes a housing, a base plate attached to and displaced a distance from said housing, a right vertical support and a left vertical support both disposed in the distance and connecting the base plate to the housing, internal drift connecting apparatus disposed internally to the housing and including a saw blade having reciprocating motion so that the penciled or inscribed line followed by the saw blade during the cutting process is automatically corrected, and external drift correcting apparatus disposed externally to the housing and on the base plate so that as the saw blade travels along the penciled or inscribed line, any drift off the penciled or inscribed line would be detected by the right and the left photoresistors and instantly fed to the blade drive motor for the saw blade correction.

10 Claims, 2 Drawing Sheets

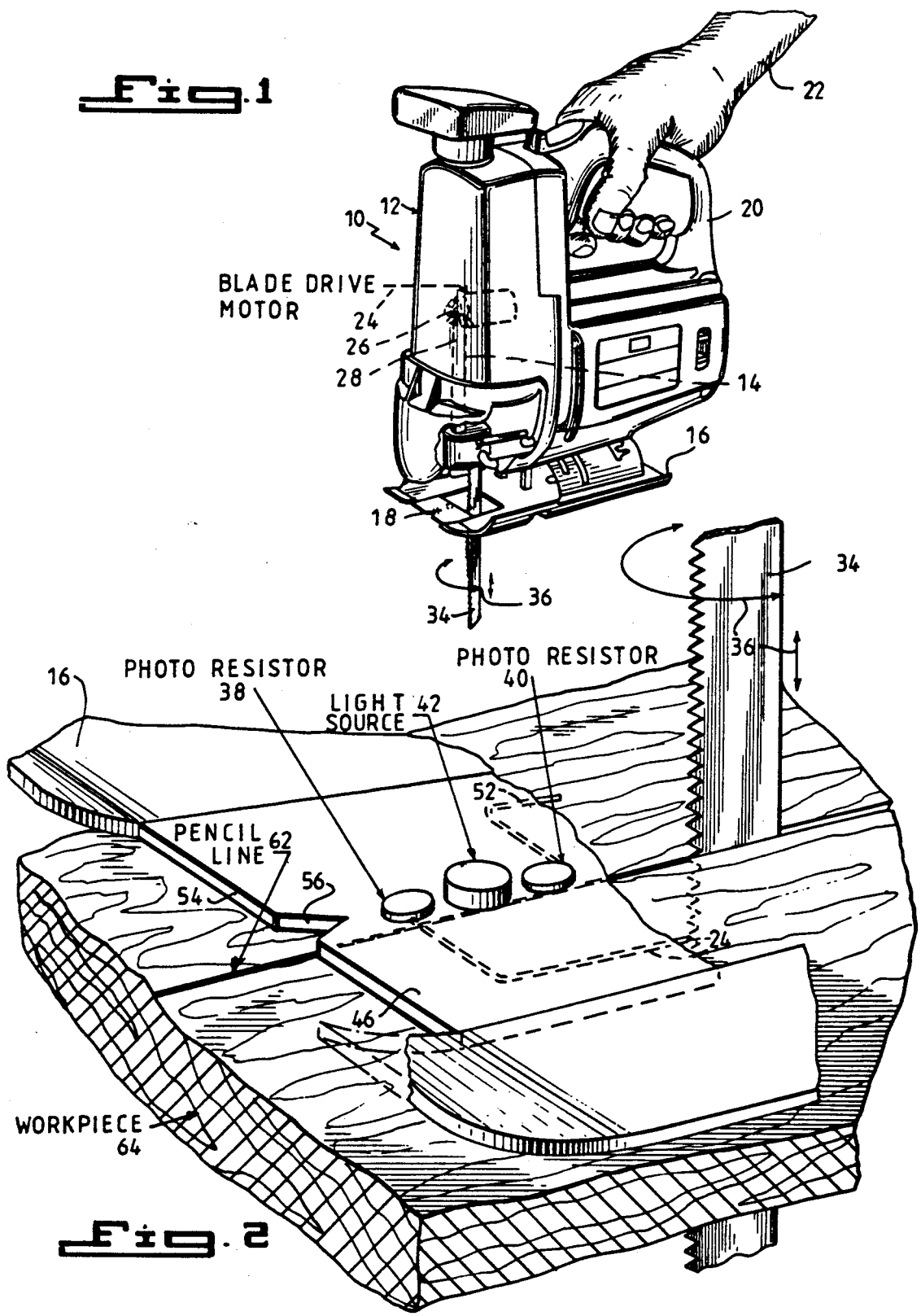

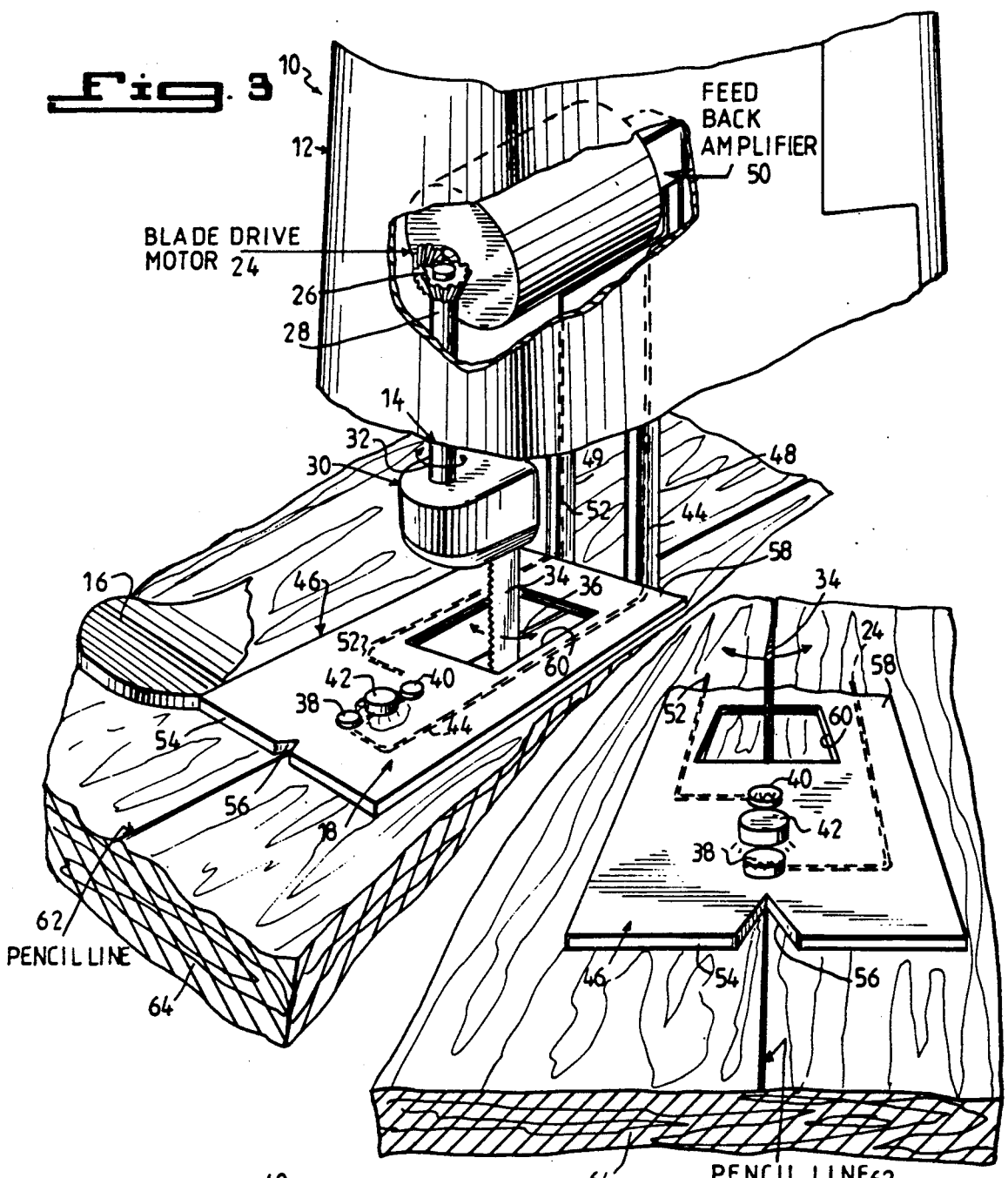

OPTICALLY GUIDED POWER SABRE SAW

BACKGROUND OF THE INVENTION

1. Field of the Invention

The present invention relates to a sabre saw.

More particularly, the present invention relates to an optically guided power sabre saw.

2. Description of the Prior Art

The electric sabre saw, in popular use today for the sawing of wood pieces, is manually guided over the penciled or inscribed line. This is so, because they depend on the user for visual guidance s that the resultant cut is rarely accurate. Due to this user limitation, the electric sabre saw should be used for rough work only.

Numerous innovations for power sabre saws have been provided in the prior art that are adapted to be used. Even though these innovations may be suitable for the specific individual purposes to which they address, they would not be suitable for the purposes of the present invention as heretofore described.

Accordingly, it is an object of the present invention to provide a power sabre saw that avoids the disadvantages of the prior art.

More particularly, it is an object of the present invention to enable the user to produce far more accurate cuts than what are possible with currently available electric sabre saws.

While the power sabre saw of the present invention would not provide the level of accuracy necessary for finely detailed work, the achieved accuracy would still be an order of magnitude better than what is presently possible with the conventional electric sabre saws.

Reflected light from the light source is detected by the photoresistors. As the sabre saw drifts from the penciled or inscribed line, less light is absorbed by the darker penciled or inscribed line and more light is "seen" by the photoresistors. As the sabre saw blade drifts right or left, the blade is corrected by the blade drive motor, back to the penciled or inscribed line. Small corrections applied quickly keep the blade on the penciled or inscribed line.

In keeping with these objects, and with others which will become apparent hereinafter, one feature of the present invention resides, briefly stated, in an optically guided power sabre saw having, a housing, a base plate attached to and displaced from the housing, a right vertical support and a left vertical support being disposed in the distance and connecting the base plate to the housing, internal drift correcting means disposed internally to the housing and including a saw blade having reciprocating motion so that the penciled o inscribed line followed by the saw blade during the cutting process is automatically corrected, and external drift correcting means are disposed externally to the housing and on the base plate.

When the optically guided power sabre saw is designed in accordance with the present invention, as the saw blade travels along the penciled or inscribed line, any drift off the penciled or inscribed line would be detected by the right and the left photoresistors and instantly fed to the blade drive motor for the saw blade correction.

In accordance with another feature of the present invention, the internal drift correcting means include a blade drive motor, a gear set, and a rotary blade bar having rotary motion.

Another feature of the present invention is that it further comprises a convector for changing the rotary motion of the rotary blade bar to the reciprocating motion of the saw blade.

Yet another feature of the present invention is that the external drift correcting means is disposed on the base plate and include a left photoresistor, a right photoresistor, and a light source, the light source being disposed intermediate and colinear with the left photoresistor and the right photoresistor.

Still another feature of the present invention is that the light source is chosen from the group consisting of conventional light and laser light.

Yet still another feature of the present invention is that the left photoresistor and the right photoresistor are chosen from the group consisting of photoresistors, photodiodes, and phototransisters.

Still yet another feature of the present invention is that it further comprises a feed-back amplifier disposed between the left and right photoresistors and the blade drive motor.

Another feature of the present invention is that the left wire of the left photoresistor travels underneath the base plate through the left vertical support and up to the feed back amplifier which is electrically connected to the blade drive motor.

Yet another feature of the present invention is that the right wire of the right photoresistor travels underneath the base plate through the right vertical support and up to the feedback amplifier which is electrically connected to the blade drive motor.

Still another feature of the present invention is that the base plate has a front end containing a "V"-shaped cut out and a back end containing a substantially square cut-out.

The novel features which ar considered characteristic for the invention are set forth in particular in the appended claims. The invention itself, however, both as to its construction and its method of operation, together with additional objects and advantages thereof, will be best understood from the following description of the specific embodiments when read in connection with the accompanying drawing.

BRIEF DESCRIPTION OF THE DRAWING

FIG. I is a perspective view of the optically guided power sabre saw of the present invention;

FIG. 2 is a three-quarter perspective view of the shoe of the optically guided power sabre saw of the present invention, shown in FIG. 1;

FIG. 3 is a perspective view, with lines broken away, of the drift correction means used in the optically guided power sabre saw of the present invention, shown in FIG. 1;

FIG. 4 is a front perspective view of the shoe of the optically guided power sabre saw of the present invention, shown in FIG. 2; and FIG. 5 is a side view of the shoe of the optically guided power sabre saw of the present invention, shown in FIGS. 2 and 4.

LIST OF REFERENCE NUMERALS UTILIZED IN THE DRAWING

10—optically guided power sabre saw

12—housing of the optically guided power sabre saw

14—internal drift correcting means disposed within the housing 12

16—saw base portion of the optically guided power saw base 10

18—external drift correcting means disposed on the saw base portion 16

20—handle of the optically guided power sabre saw 10

22—hand of a user

24—blade drive motor of the internal drift correcting means 14

26—gear set of the internal drift correcting means 14

28—blade bar of the internal drift correcting means 14

30—converter of the internal drift correcting means 14

32—rotary motion of the blade bar 28

34—saw blade of the optically guided power sabre saw 10

36—reciprocating motion of the saw blade 34

38—"left" photoresistor of the external drift correcting means 18

40—"right" photoresistor of the external drift correcting means 18

42—light source of the external drift correcting means 18

44—left wire of the "left" photoresistor

46—plate for substantially mounting the external drift correcting means 18

48—"left" vertical support for carrying the left wire 44 from the external drift correcting means 18 to the feed back amplifier 50

49—"right" vertical support for carrying the right wire 52 from the external drift correcting means 18 to the feed back amplifier 50

50—feed back amplifier

52—right wire of the "right" photoresistor 40

54—front end 46

56—"V"-shaped cut out contained in the front end 54

58—back end of the plate 46

60—cutout contained in the back end 58

62—penciled or inscribed line on the workpiece 64

64—workpiece being cut by the optically guided power sabre saw 10

DETAILED DESCRIPTION OF THE PREFERRED EMBODIMENT

Referring now to FIG. 1, the optically guided power sabre saw of the present invention is shown generally at 10, and has a housing 12 containing internal drift correcting means 14, and a base portion 16 containing external drift correcting means 18.

As shown, the optically guided power sabre saw 10 of the present invention includes a handle 20, being grasped by a hand 22 of a user, in the conventional manner, since the optically guided power sabre saw 10 of the present invention has the basic external design of a conventional sabre saw.

As shown now in FIGS. 1 and 3, the internal drift correcting means 14 include a blade drive motor 24, a gear set 26, and a blade bar 28. A converter 30 is provided for changing the rotary motion 32 of the blade bar 28 to the reciprocating motion 36 of the saw blade 34.

The details of the external drift correcting means 18 can best be seen in FIGS. 2 through 5. The external drift correcting means 18 disposed on the saw base portion 16, includes a "left" photoresistor 38, a "right" photoresistor 40, and a light source 42 disposed intermediate and colinear with the "left" photoresistor 38 and the "right" photoresistor 40.

The light source 42 could be either conventional or laser and the light sensors 38 and 40 could be either photoresistors, photodiodes, or phototransitters.

The feed-back amplifier 50 is disposed between the photoresistors and the blade drive motor 24. There are a lot of different commonly known amplifiers 50 that can be used in the optically guided power sabre saw 10 of the present invention, and one with ordinary skill in the art would be technically competent to design such an amplifier 50.

The "left" wire 44 of the left photoresistor 38 travels underneath the base plate 46, through the left vertical support 48 and up to the feed back amplifier 50 which is electrically connected to the blade drive motor 24.

The "right" wire 52 of the right photoresistor 40, travels underneath the plate 46, through the right vertical support 49 and up to the feedback amplifier 50 which is electrically connected to the blade drive motor 24.

The plate 46 contains the external drift correcting means 18 and has a front end 54 containing a "V"-cut 56, and a back end 58 containing a cut out 60.

In operation, the optically guided power sabre saw of the present invention, assists the user by automatically correcting the path followed by the sawblade 34 during the cutting process.

The photoresistors (or photodiodes) 38 and 40 located in the saw base track 16 reflect the light from the penciled or inscribed line 62. The output signals from the photoresistors 38 and 40 are fed to a small, electric drive motor 24 which controls the cutting path of the saw blade 34.

As the saw blade 34 travels along the penciled or inscribed line 62, any drift off the line would be detected by the photoresistors 38 and 40 and instantly fed to the blade drive motor 24 for blade correction.

In practice, only small corrections, if executed early enough, would be necessary to insure a straight cut. The user need only push the optically guided power sabre saw 10 of the present invention along the penciled or inscribed line 62 to achieve an accurate cut.

It will be understood that each of the elements described above, or two or more together, may also find a useful application in other types of constructions differing from the type described above.

While the invention has been illustrated and described as embodied in an optically guided power sabre saw, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An optically guided power sabre saw using a penciled or an inscribed line to follow, comprising:
   (a) a housing;

(b) a base plate attached to and displaced a distance from said housing, a right vertical support and a left vertical support both being disposed said distance and connecting said base plate to said housing;

(c) internal drift correcting means disposed internally to said housing and including a saw blade having reciprocating motion so that the penciled or inscribed line followed by said saw blade during the cutting process is automatically corrected; and (d) external drift correcting means disposed externally to said housing and on said base plate and including a right photoresistor and a left photoresistor so that as said saw blade travels along said penciled or inscribed line, any drift off said penciled or inscribed line would be detected by said right and said left photoresistors and instantly fed back to said blade drive motor for said saw blade correction.

2. A saw as defined in claim 1, wherein said internal drift correcting means include a blade drive motor, a gear set, and a rotary blade bar having rotary motion.

3. A saw as defined in claim 2; further comprising a convertor for changing said rotary motion of said rotary blade bar to said reciprocating motion of said saw blade.

4. A saw as defined in claim 3, wherein said external drift correcting means is disposed on said base plate and include said left photoresistor, said right photoresistor, and a light source, said light source being disposed intermediate and colinear with said left photoresistor and said right photoresistor.

5. A saw as defined in claim 4, wherein said light source is chosen from the group consisting of conventional light and laser light.

6. A saw as defined in claim 5, wherein said left photoresistor and said right photoresistor are chosen from the group consisting of photoresistors, photodiodes, and phototransisters.

7. A saw as defined in claim 6; further comprising a feed-back amplifier disposed between said left and right photoresistors and said blade drive motor.

8. A saw as defined in claim 7, wherein said left wire of said left photoresistor travels underneath said base plate through said left vertical support and up to said feedback amplifier which is electrically connected to said blade drive motor.

9. A saw as defined in claim 8, wherein said "right" wire of said right photoresistor travels underneath said base plate through said right vertical support and up to said feedback amplifier which is electrically connected to said blade drive motor.

10. A saw as defined in claim 9, wherein said base plate has a front end containing a "V"-shaped cut out and a back end containing a substantially square cut-out.

* * * * *